(12) United States Patent
Landru

(10) Patent No.: US 11,191,256 B1
(45) Date of Patent: Dec. 7, 2021

(54) SPRAY BAR AXIALLY ROTATABLE ALONG TWO AXES TO ALIGN WITH FISH TANK WALL

(71) Applicant: Walton Landru, Greenwood Lake, NY (US)

(72) Inventor: Walton Landru, Greenwood Lake, NY (US)

( * ) Notice: Subject to any disclaimer, the term of this patent is extended or adjusted under 35 U.S.C. 154(b) by 276 days.

(21) Appl. No.: 16/458,242

(22) Filed: Jul. 1, 2019

(51) Int. Cl.
*A01K 63/04* (2006.01)

(52) U.S. Cl.
CPC .......... *A01K 63/042* (2013.01); *A01K 63/047* (2013.01)

(58) Field of Classification Search
CPC .... A01K 63/042; A01K 63/047; A01K 63/04; A01K 63/003; A01K 63/006; A01K 63/00; F16L 3/04; F16L 3/1226
USPC ........ 119/263; 239/142; 47/21.1, 69, 79, 82; 248/315, 62, 74.1, 74.2, 74.3, 74.4
See application file for complete search history.

(56) References Cited

U.S. PATENT DOCUMENTS

| | | | | |
|---|---|---|---|---|
| 1,382,235 | A * | 6/1921 | Raymond | F21V 19/00 248/315 |
| 3,045,922 | A | 7/1962 | Jensen | |
| 9,334,887 | B2 * | 5/2016 | Leo, II | F16L 3/02 |
| 2003/0071174 | A1 * | 4/2003 | Jager | B01F 3/0412 248/74.3 |
| 2005/0051675 | A1 * | 3/2005 | Benoit | F16L 3/127 248/74.2 |
| 2005/0218051 | A1 * | 10/2005 | Tsai | A01K 63/042 210/167.26 |
| 2012/0199704 | A1 * | 8/2012 | Taylor | F16G 11/146 248/74.1 |
| 2017/0127656 | A1 * | 5/2017 | Bee | A01K 63/045 |

OTHER PUBLICATIONS

NPL DIYSP (Screen captures from YouTube video clip entitled "DIY Spray Bar for your Canister Filter", 4 pages, uploaded Feb. 24, 2019 by user "Aquarium Co-Op". Retrieved from Internet < https://www.youtube.com/watch?v=eSsxULH9SCs>) (Year: 2019).*
U-Tube with Directional Return ½Inch-¾ inch, Marinedeport.com, accessed Mar. 26, 2019.
Collections Etc 38074 50-ft Soaker and Sprinkler Hose, PVC, Google Express, Accessed Mar. 15, 2019.

(Continued)

*Primary Examiner* — Kathleen I Alker
*Assistant Examiner* — Carly W. Lynch
(74) *Attorney, Agent, or Firm* — Michael J. Feigin, Esq.; Feigin and Fridman LLC

(57) ABSTRACT

Fish tank spray devices of embodiments of the disclosed technology include a length of horizontal pipe with multiple portals arranged in a row which extend into the length of horizontal pipe. Water is sprayed from these portals in embodiments of the disclosed technology. The other side of the pipe is connected to various lengths of pipe which bring the water to the spray bar including a 270 degree bent length of a pipe followed by a 180 degree bent length of pipe having an interior in fluid and direct connection with the length of horizontal pipe. These turns can be adjusted in a transverse direction by rotating connection points within the pipes in two different planes which are perpendicular to each other allowing the spray bar to be oriented parallel and abutting against a length of an inside of the fish tank wall.

7 Claims, 8 Drawing Sheets

(56) References Cited

OTHER PUBLICATIONS

Fluval Spray Bar Kit for 06, 07, Filters, fluval.com, dated Feb. 15, 2019.
Fluval Spray Bar Kit installation Manual, dated Feb. 15, 2019.
Flow Tamer Spray Bar FX4/FX5/FX6, Applicant Disclosure on Ebay Jan. 4, 2019.

* cited by examiner

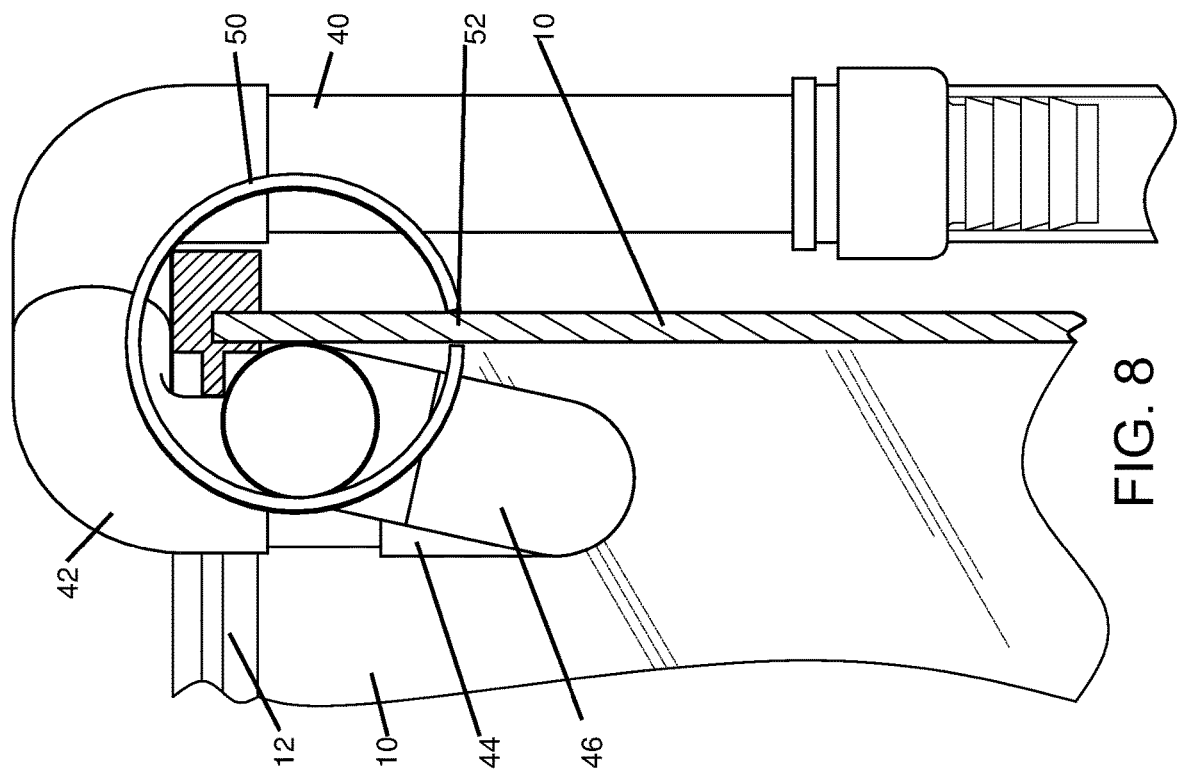
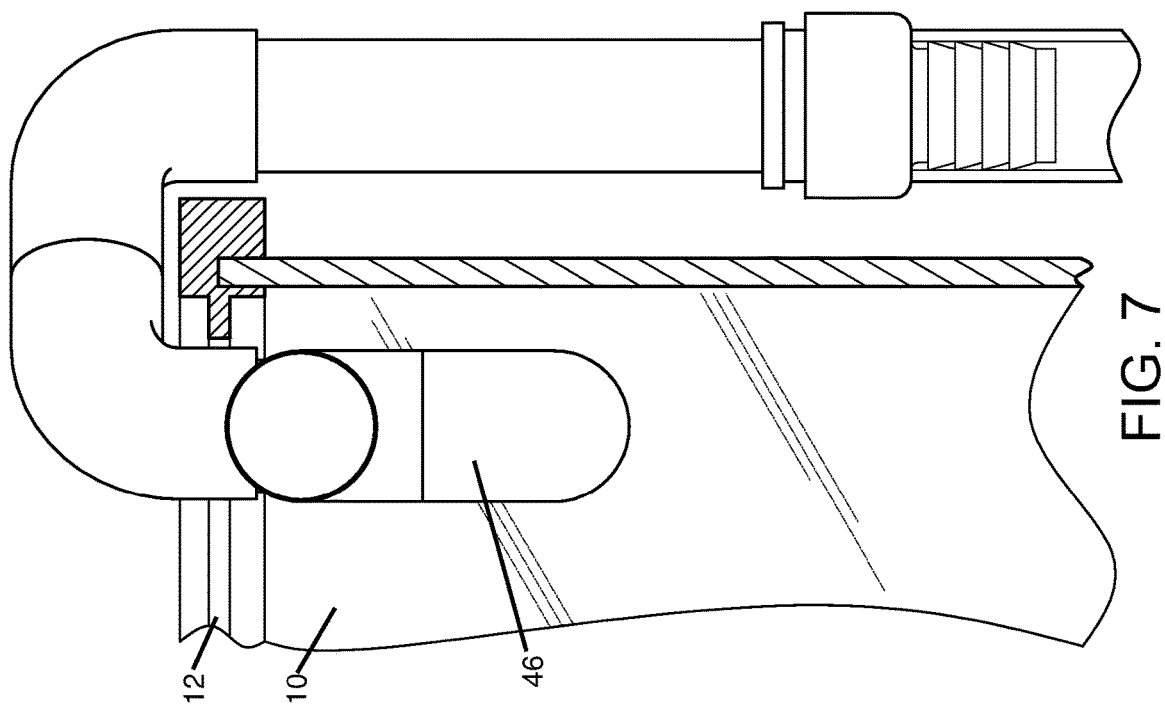

SPRAY BAR AXIALLY ROTATABLE ALONG TWO AXES TO ALIGN WITH FISH TANK WALL

FIELD OF THE DISCLOSED TECHNOLOGY

The disclosed technology relates generally to aquariums, and, more specifically, to spray bars.

BACKGROUND OF THE DISCLOSED TECHNOLOGY

Spray bars are used in fish tanks to circulate and oxygenate water therein by pumping the water through pipes and expelling the water in streams back into the tank. FIG. 1 shows a perspective view of a prior art spray bar and fish tank. Here, one can see that a vertical pipe 20 extends outside the fish tank side wall 10 and then turns at pipe 22 into the tank where it extends downwards and then to a spray bar which is the horizontal section of pipe with, in this case and as is typical, a plurality of horizontally aligned portals. The spray bar is spaced apart from the side wall 10 of the fish tank at a distance of 30 and held to the side wall 10 by a suction cup or suction cups 24. While this method works, suction cups become detached over time or lose their functionality completely and the lip 12 at the top of the fish tank, which is often there to hold class or other objects, inhibits where the spray bar can be placed requiring elongated connections to the suction cups placement of a bar lower down in the tank which may, in turn, allow less water in the tank should one wish for the water jets to be above the water for maximum oxygenation. The lip 12 is a defined as a device along a top edge of a wall of a fish tank which extends inwards from the wall towards another wall on an opposite side (such as if a mirror image of FIG. 1 were shown, being an opposite side of the fish tank thereof).

FIG. 2 shows a perspective view of piping connections used in the prior art spray bar of FIG. 1. FIG. 3 shows a cutaway elevation view of piping connections in the prior art spray bar of FIG. 1. Here the vertical pipe 20 turns at pipe 22 forming a 180 degree turn. Another 90 degree turn is then present before the spray bar is attached and the suction cups 24 are used to hold the spray bar, or attempt to hold the spray bar, in place which is often a clumsy attachment mechanism that comes lose over time and especially as water sprayed there-through shakes lose the attachment mechanisms. The space 30 between the pipes and wall 10 of the fish tank also leave room for the pipes to come closer/further to the wall and "shake" loose over time. the lip 12 prevents one from moving the pipe closer.

What is needed is a way to more strongly and reliably install spray bar in a fish tank. It is further needed to have greater flexibility of installation of a spray bar as fish tank configuration and needs can vary from application to application.

These and other limitations of the prior art are solved by embodiments described in the present disclosure.

SUMMARY OF THE DISCLOSED TECHNOLOGY

Fish tank spray devices of embodiments of the disclosed technology include a length of horizontal pipe with multiple portals arranged in a row which extend into the length of horizontal pipe. Water is sprayed from these portals in embodiments of the disclosed technology. The horizontal pipe has a capped end. On the other side of the pipe, it is connected to various lengths of pipe which bring the water to the spray bar (the "horizontal pipe") including a 270 degree bent length of a pipe having an interior in fluid and direct connection with the length of horizontal pipe. This 270 degree bent length of pipe is, in turn, connected to a 180 degree bent length of pipe having an interior in fluid and direct connection thereto, which is, in turn, connected to a vertical length of pipe in fluid and direction connection thereto. As such, water passing through the pipe can pass upwards and over a top of a fish tank then down into the fish tank where it is goes around two turns before extending horizontally. These turns can be adjusted in a transverse direction by rotating connection points within the pipes in two different planes which are perpendicular to each other allowing the spray bar to be oriented parallel with, flush with, abutting with, and/or otherwise adjacent and along a length of an inside of the fish tank wall such as just under (defined as "with 10 cm") a lip (top edge of the fish tank which, in embodiments, extends further inwards into the tank) or abuts the lip.

For purposes of this disclosure, directional orientations are with respect to gravity and secondarily, how a fish tank is typically used. Thus, "bottom" refers to towards a center of gravity such as a center of the Earth and "top" refers to a direction away from or opposite the bottom. A bottom of a fish tank is a side closest to the ground and a top is an opposite side thereof. The sides are walls which are water tight and extend upwards from the bottom.

As such, the pipes of the spray device of the disclosed technology can connect in the following order: a vertical length of pipe is connected to the 180 degree bent length of pipe; the 180 degree bent length of pipe is connected to the 270 degree bent length of pipe; the 270 degree bent length of pipe is connected to the horizontal pipe; the horizontal pipe terminates at the capped end. In such an embodiment the horizontal pipe can abut a side wall of the fish tank and/or abuts an interior extending lip of the fish tank, the lip connected to a top side of the side wall of the fish tank and be "interior extending" in that it extends between two vertical planes defined by vertical walls of the fish tank such as the glass walls thereof.

A ring can be used to hold the horizontal pipe (spray bar) flush against an interior wall of the fish tank. The horizontal pipe is thus held such that it's most elongated length is in contact with the fish tank wall or substantially in contact with (defined as "the most elongated length of the horizontal pipe being no greater than 1 cm from the fish tank wall and in contact with the fish tank wall in at least two places). The ring can be mostly circular with a portal interrupting the circular nature thereof, such as one having an arc angle of 5, 10, or 15 degrees when the ring is left to rest (also referred to as "unencumbered"). The opening is adapted for and/or does abut, at either end thereof, to the side wall of said fish tank. As such, the interior side of the ring circumstantially surrounds and contacts (e.g. at a tangent point) an exterior side of the spray bar. A "spray bar" is defined as a horizontal length of pipe with multiple portals in line with one another arranged along a horizontal length thereof, or a horizontal length of pipe with at least two portals in line with each other.

The length of vertical pipe is exterior to the fish tank in some embodiments while the 180 degree bent length of pipe extends from exterior to interior of the fish tank. A connection between the 180 degree bent length of pipe and the 270 degree bent length of pipe is rotatable in embodiments of the disclosed technology. An additional connection is also rotatable, namely, in embodiments, a connection within the 270 degree bent length of pipe which can be rotated along an axis (plane) which is perpendicular to an axis of rotation of the connection between the 180 degree bent length of pipe and the 270 degree bent length of pipe.

Described another way, a fish tank spray device of an embodiment of the disclosed technology has a horizontal spray pipe having a most elongated side abutted (in contact with at, at least, two separate points or along a majority of a length thereof) against an inside of a fish tank. Piping attaches to the horizontal spray pipe (also referred to as a "spray bar"), the piping extending as follows: a) parallel to an outside of a wall of the fish tank; b) over a top of the wall of said fish tank; c) parallel to an inside of the wall of the fish tank; and d) around a turn before attaching to the horizontal spray pipe. The turn is adjustable in two separate axes by rotating connection points between parts of the piping (such as by rotation along the X axis and along the Z axis at each of two different connection points of pipes of the device).

Rotation of the first connection point rotates a piece of the piping which extends in parallel with the wall of the fish tank causing piping "d)" to move closer to the wall of the fish tank. Rotation of the second connection point rotates a piece of the piping which extends in parallel with the wall of the fish tank which is also parallel to the horizontal spray pipe.

An open ring holds the horizontal spray pipe against the wall of the fish tank in embodiments and can extend over a top of the wall of the fish tank while abutting each of an inside and outside part of the wall of the fish tank and hold the horizontal pipe (spray bar).

A pipe which extends around a lip of a fish tank wall and downwards into the fish tank before turning in a horizontal direction is also disclosed. A horizontal section of the pipe has multiple portals adapted to release liquid, the pipe having two twistable parts in transverse directions to one another adapted to place the horizontal section of the pipe in parallel and abut an inside of the fish tank. A series of hollow rings (meaning that within the rings there is no material) with cutout section (meaning that the 'ring' itself is missing material from what otherwise would be a complete circular shape) holds the horizontal section of the pipe to the fish tank.

Any device or step to a method described in this disclosure can comprise, or consist of, that which it is a part of, or the parts which make up the device or step. The term "and/or" is inclusive of the items which it joins linguistically, and each item by itself.

BRIEF DESCRIPTION OF THE DRAWINGS

FIG. 7 shows a cutaway elevation view of piping connections used in embodiments of the disclosed technology.

FIG. 8 shows a cutaway elevation view of piping connections with a spray bar held in abutment with a fish tank wall in an embodiment of the disclosed technology.

DETAILED DESCRIPTION OF EMBODIMENTS OF THE DISCLOSED TECHNOLOGY

Figure 1:
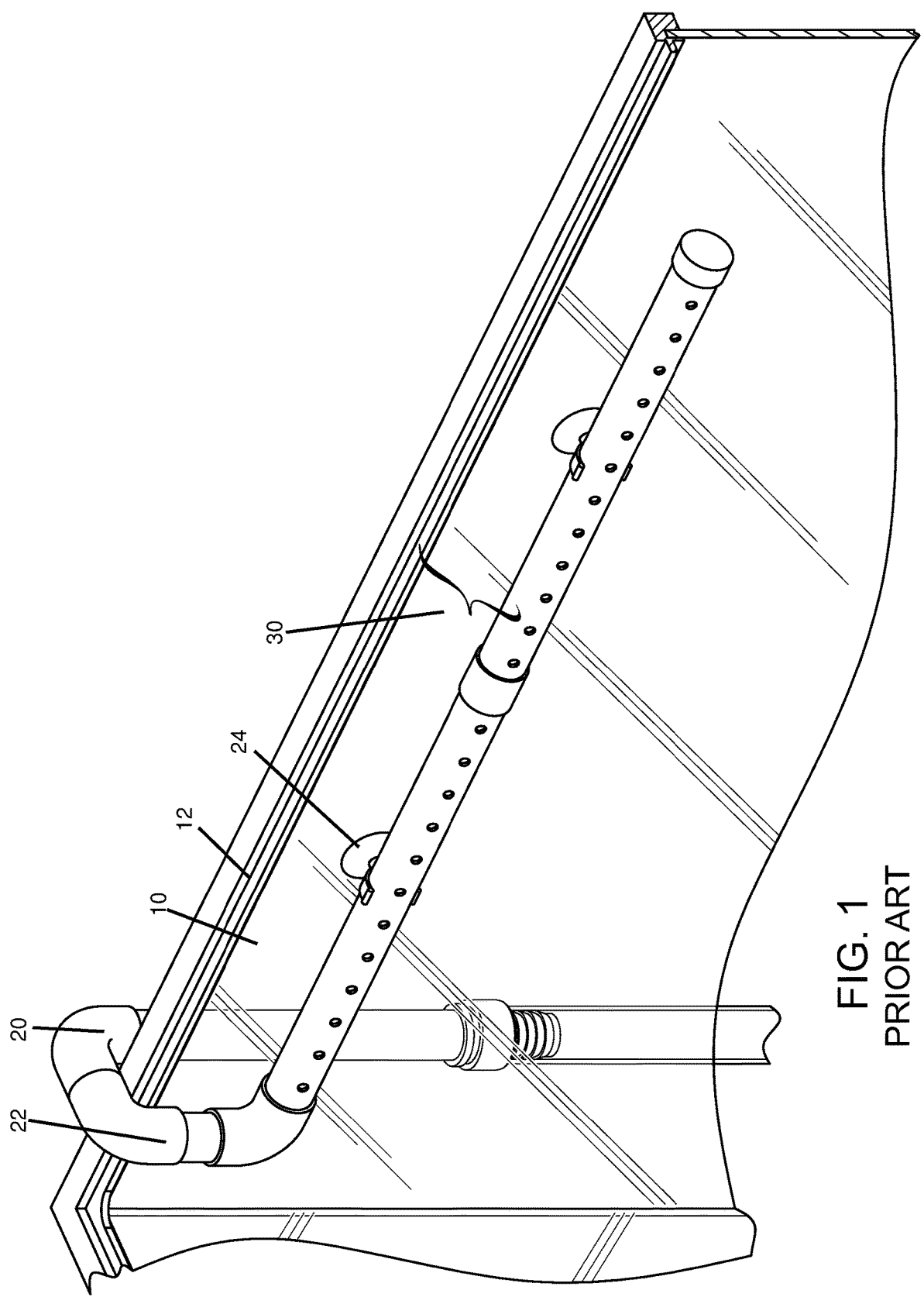
FIG. 1 shows a perspective view of a prior art spray bar and fish tank.
Figure 3:
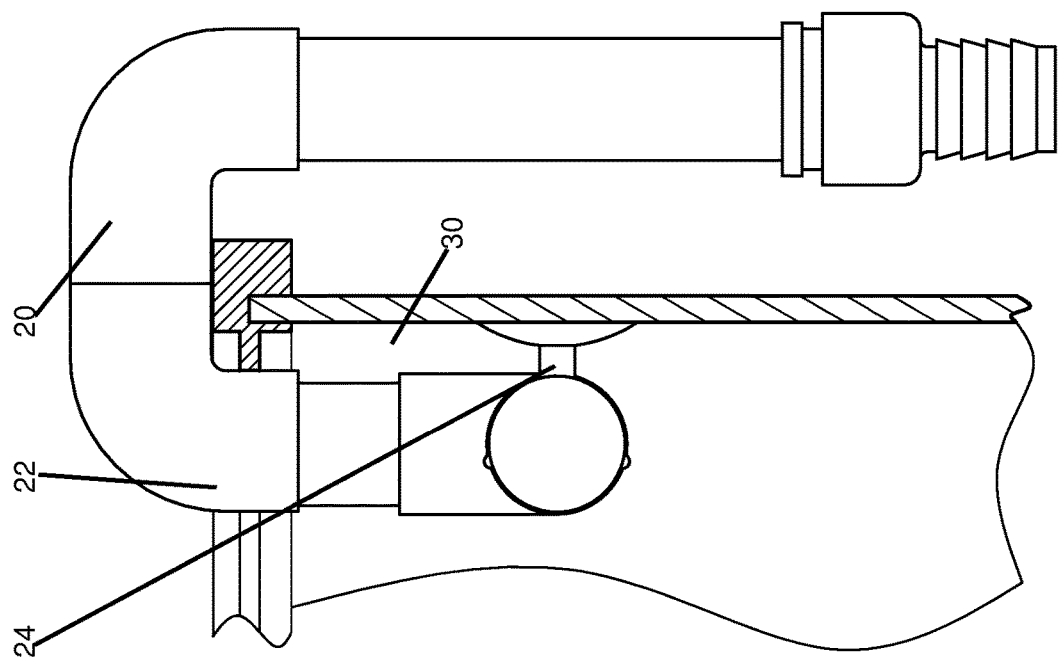
FIG. 3 shows a cutaway elevation view of piping connections in the prior art spray bar of FIG. 1.
Figure 2:
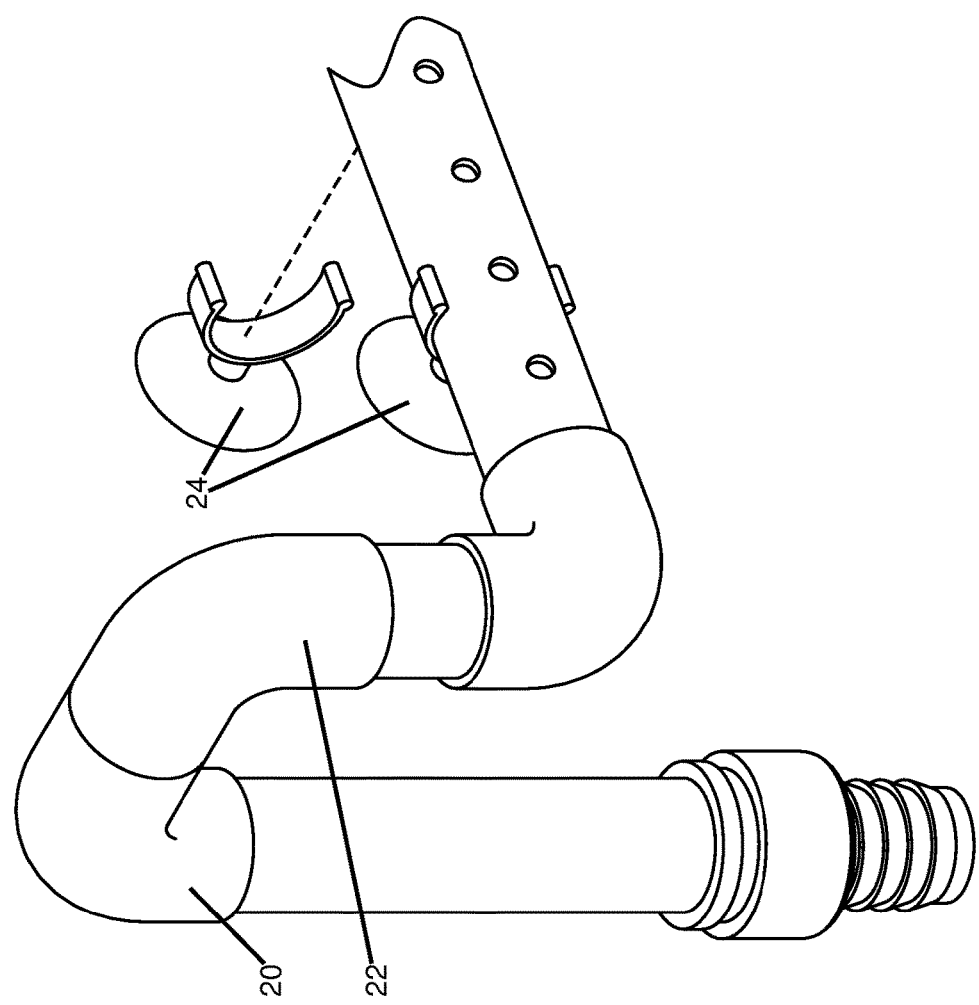
FIG. 2 shows a perspective view of piping connections used in the prior art spray bar of FIG. 1.
Figure 4:
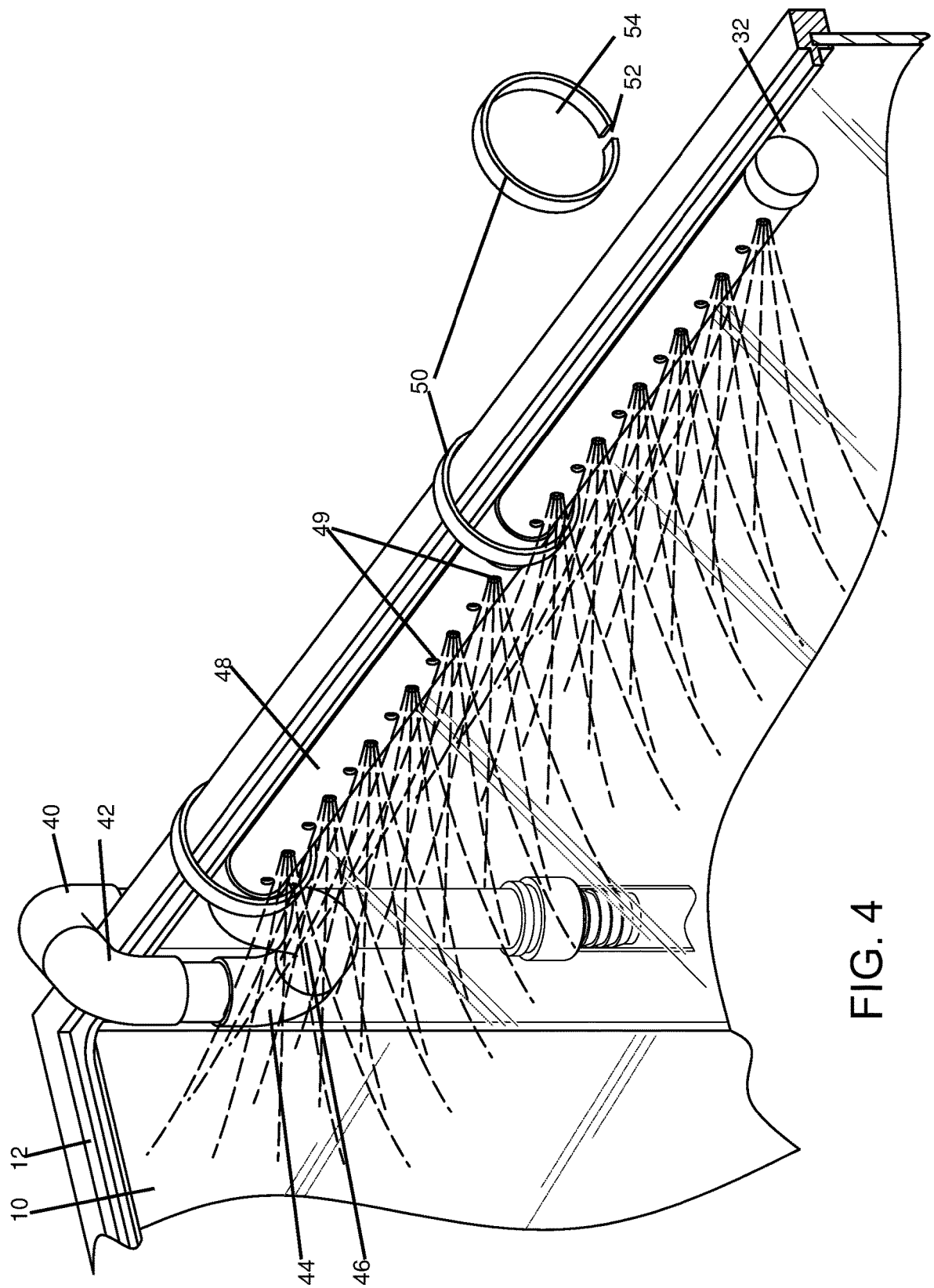
FIG. 4 shows a perspective view of a spray bar of an embodiment of the disclosed technology.

FIG. 4 shows a perspective view of a spray bar of an embodiment of the disclosed technology. Here, the spray bar 48 has an elongated length of horizontal pipe (horizontal in that it is adapted to or does extend in a horizontal direction on an interior side of a vertical wall 10 of a tank). The spray bar has a plurality of outlets 49 through which water or another liquid is expelled. It is held against (in contact along a horizontal length thereof) an interior side of a vertical wall 10 of a fish tank and, in some embodiments, under an interior extending lip 12 of the fish tank. This lip is at a top side of a wall, such as wall 10, and extends over a section of the fish tank which is circumscribed by the walls. Such a lip prevents a pipe, which extends over the lip and downwards into an area between the walls of the tank, and as such, the pipe must extend further inwards than what would be adjacent to/touching an interior side of the tank.

Thus, a vertical pipe on an outside of the tank walls extends up and over the tank at a pipe 40 which turns 90 degrees and then another pipe 42 which turns another 90 degrees. A further pipe 44 turns yet another 90 degrees and a further section of pipe 46 turns yet another 90 degrees, but in this case, it can also turn out of a plane defined by the pipes 42 and 44 such that it joins the spray bar 48. As such, the pipe 36 is rotated such that it extends from the pipe 44 back towards the wall of the fish tank.

A ring 50 is attached, in embodiments of the disclosed technology, around the spray bar 48, lip 12 of the fish tank and at least a part of a wall of the fish tank. The ring can have a hollow center 54 and break 52 cut into the ring causes the circumference of the ring to be interrupted. The ring, thus holds securely the spray bar 48 in place by wrapping around an exterior thereof while being supported by the lip 12 of the fish tank. The open ends at the break 52 of the ring can be in contact with either or both an interior and exterior side of the fish tank walls.

Figure 5:
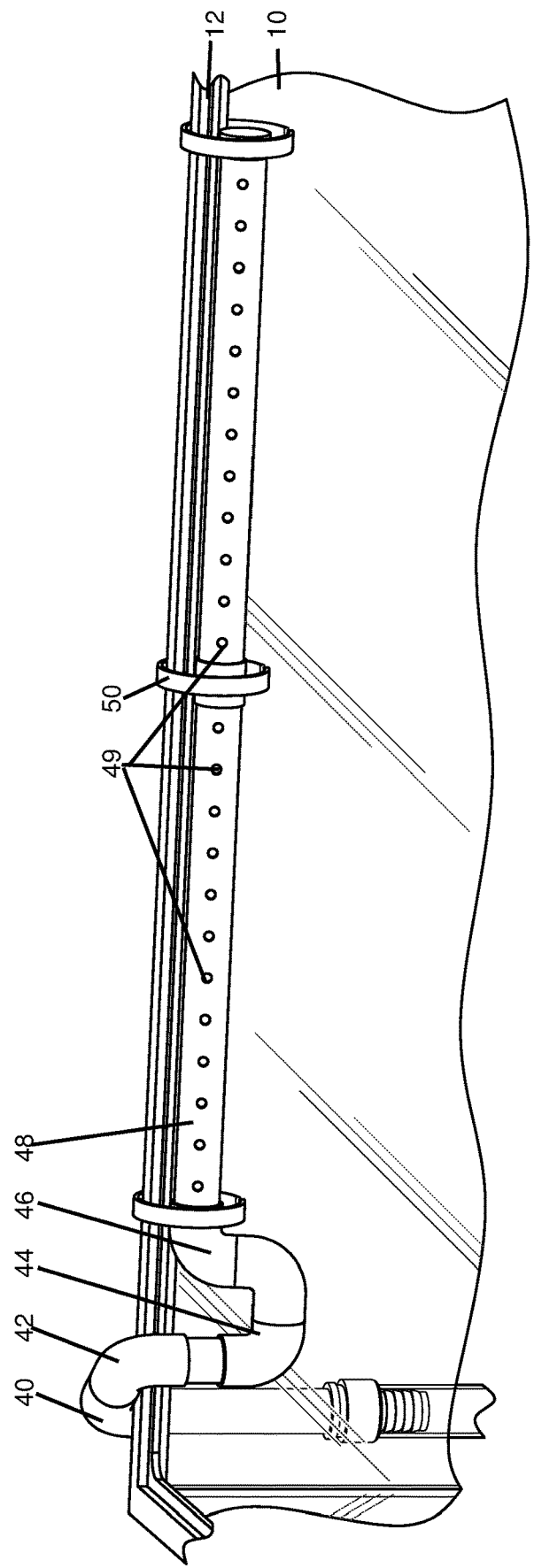
FIG. 5 shows an elevation view of the spray bar of FIG. 4.
Figure 6:
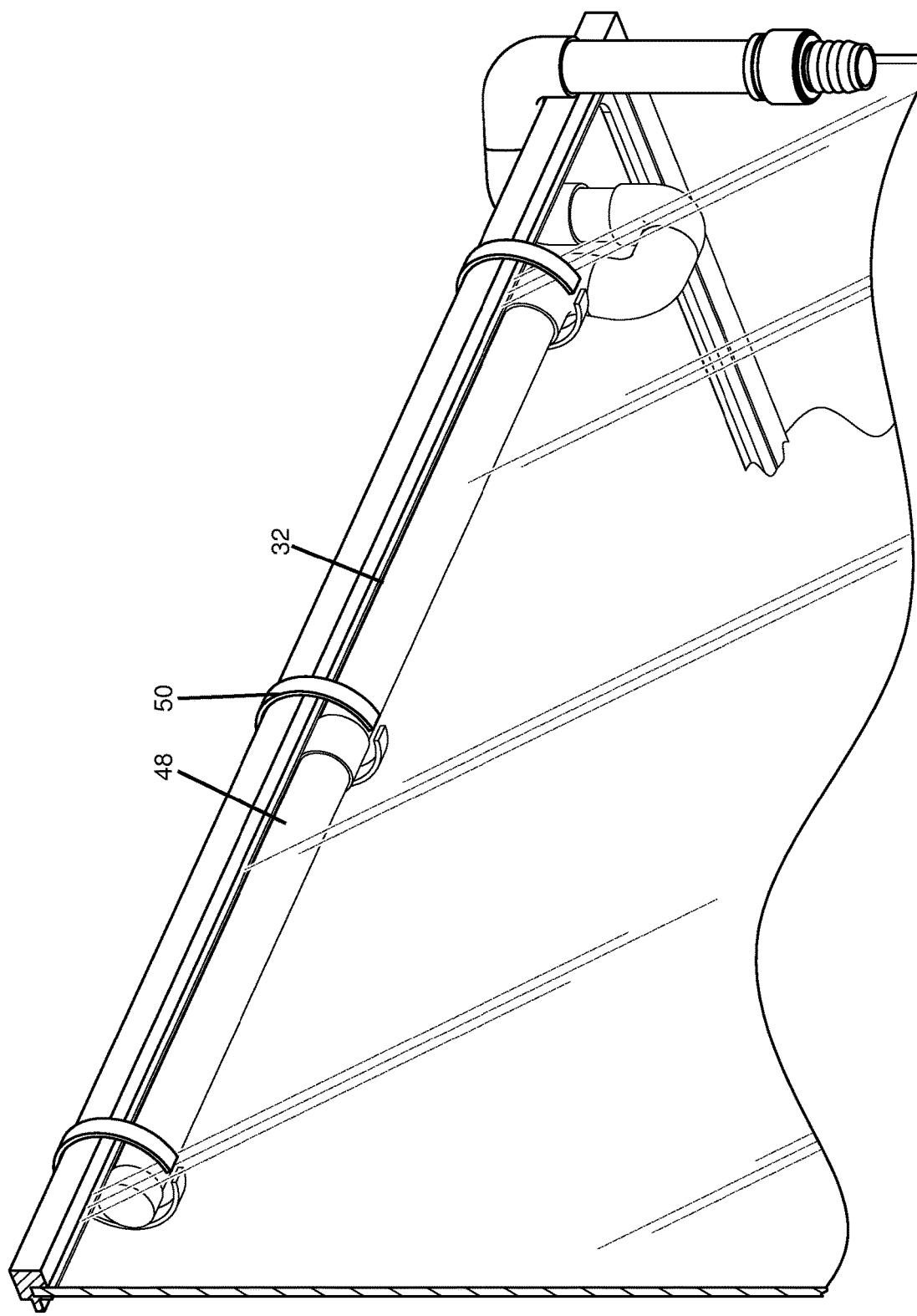
FIG. 6 shows a bottom and outside perspective view of the spray bar of FIG. 4.

FIG. 5 shows an elevation view of the spray bar of FIG. 4. FIG. 6 shows a bottom and outside perspective view of the spray bar of FIG. 4. In these view, it is clear that the spray bar 48 can be in parallel with the lip 12 at the top side of the wall 10 of the fish tank. The spray bar can be just under or adjacent to (within 1 centimeter) of a bottom side of the lip. Thus, in use the spray bar is placed high up in the tank and as close to the wall 10 of the tank as possible allowing for maximum use of the tank by aquatic life.

FIG. 7 shows a cutaway elevation view of piping connections used in embodiments of the disclosed technology. FIG. 8 shows a cutaway elevation view of piping connections with a spray bar held in abutment with a fish tank wall in an embodiment of the disclosed technology. Here, one can see that when the piping is used with just right angle turns, due to the inward extending of the lip 12 (note the crosshatched section thereof is extending towards the viewer), the piping, especially pipe 42, is forced to be separated from the wall 10 of the tank when the pipe extends downwards into the tank. (In the prior art, as described in the background, suction cups are used to fill the gap but a gap remains and the suction cups are prone to disconnect.) Thus, in FIG. 8, the pipe 46 is angled in it's connection to pipe 44 such that a distal side of pipe 46 is pressed against a wall 10 of the fish tank. A ring 50 is then attached around the pipe 46 and lip 12 while, at either end 52, abutting the wall 10 of the fish tank in some embodiments. This is not only a very stable configuration, but also allows the spray bar 48 which connects to an end of the pipe 46 to be substantially or fully against the wall 10 of the tank as well.

Figure 9:
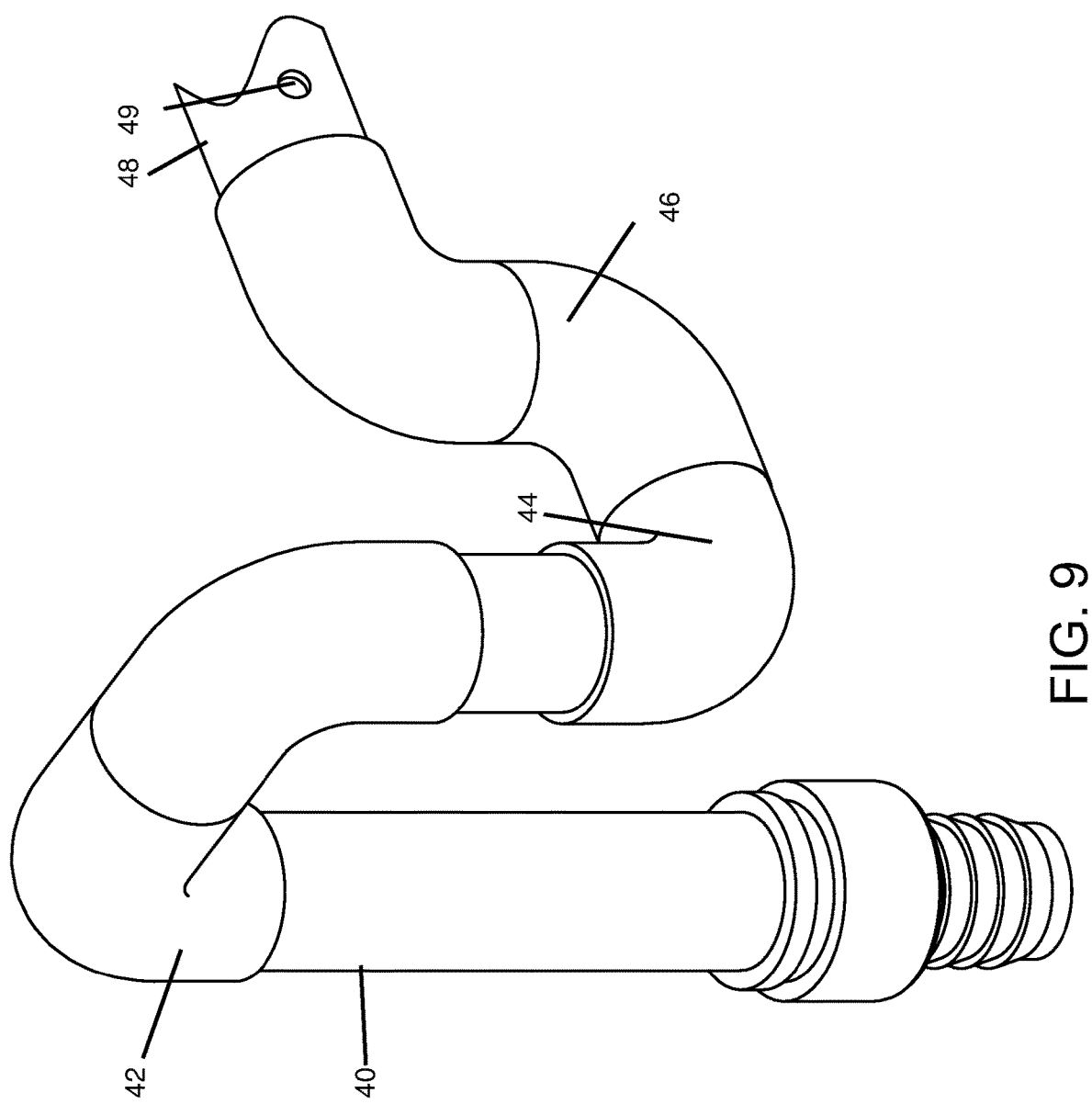
FIG. 9 shows piping used in embodiments of the disclosed technology.

FIG. 9 shows piping used in embodiments of the disclosed technology. The directions are relative to a typical use with a fish tank though other directions may be used. For example, a vertical pipe 40 extends upwards in parallel to and at an exterior to a vertical wall of a fish tank. This pipe can extend from/to any direction in embodiments of the disclosed technology. The pipe 40 then turns 180 degrees at a pipe 42 (each "pipe" can be part of a larger unitary pipe or be comprised of pipe parts which are joined together). The pipe 42 then turns at pipe 44 another 90 degrees, which then turns another 90 degrees at pipe 46 before turning back in a direction parallel to an end of pipe 44 closest to pipe 46 such that a horizontal pipe 48 (spray bar) with portals 49 extends in a horizontal direction. In this manner, the piping comprises a 180 degree turn followed by another 180 degree turn, followed by a 90 degree turn. This is up (pipe 40 to 42), over (pipe 42 passes over a top side of a fish tank wall), down (pipe 44 extends downwards into a fish tank), across (pipe 44 continues horizontally along a fish tank wall), and finally up and across (pipe 46 extends back upwards so that the spray bar 48 can be placed just under a lip of a fish tank while the spray bar 48 extends horizontally adjacent to an interior of a fish tank wall and touches the fish tank wall in embodiments of the disclosed technology).

Figure 10:
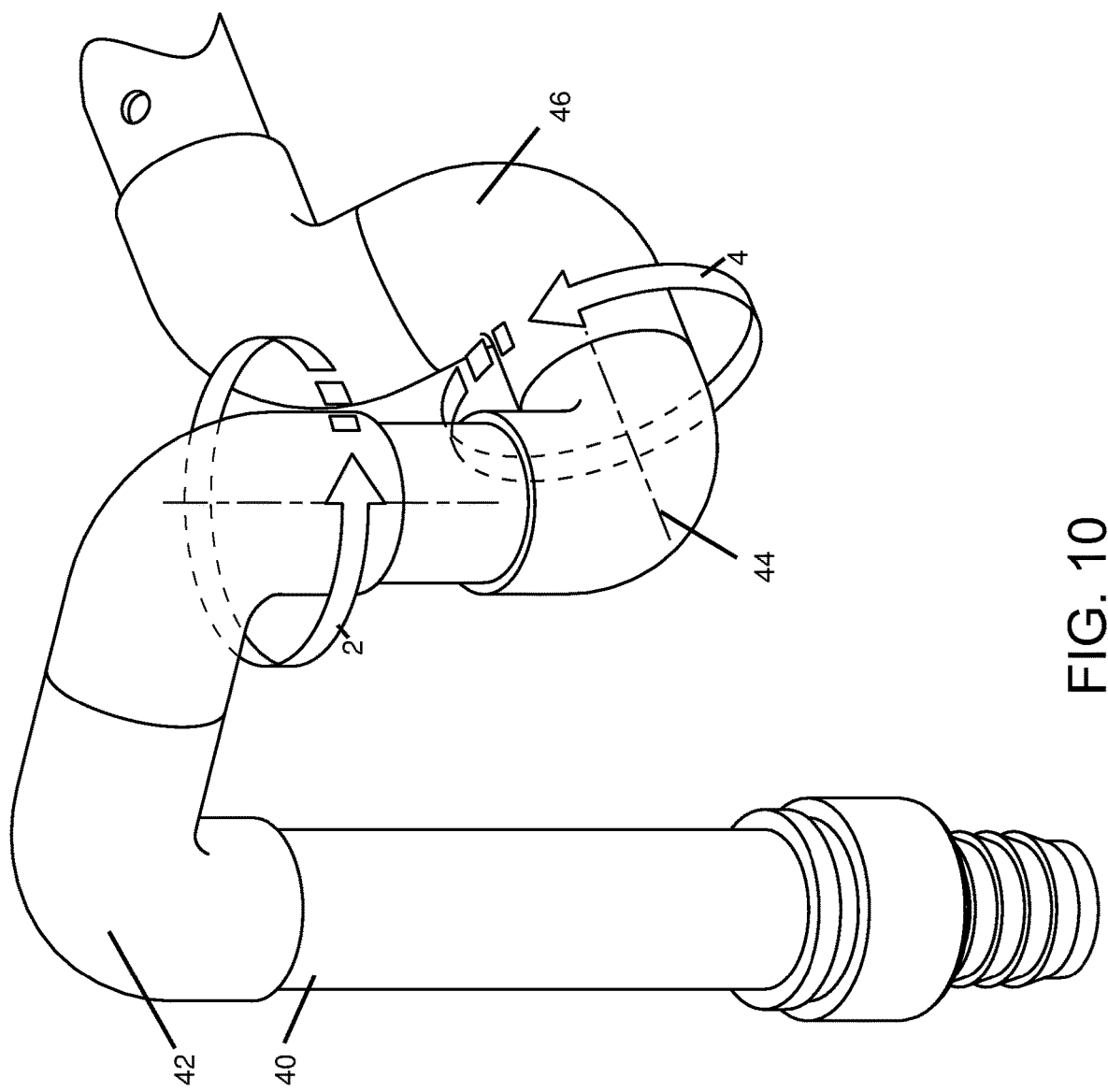
FIG. 10 shows rotatable connections within the piping of FIG. 9.

FIG. 10 shows rotatable connections within the piping of FIG. 9. FIG. 10 adds the directions of rotation 2 and 4. The pipe 44 can be rotated at either end thereof such that it rotates around a Y axis at rotation point 2 and along an X axis at rotation point 4. In this manner, one can orient pipe 44 to have an end which is functionally closest to the spray bar 48 which is in parallel to a wall of a fish tank. Then one can orient pipe 46 in such a manner that the spray bar 48 is pushed against, and in parallel with, the inside of a fish tank wall. In this manner, despite a lip of a fish tank, or even without a lip, one can safely position a spray bar in parallel with and against (along it's most elongated length) an interior of a fish tank.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A fish tank spray device adapted to be disposed within a fish tank having a side wall, the side wall having a lip extending inwardly from a top side thereof into the fish tank, the fish tank spray device comprising:
a length of horizontal pipe with multiple portals arranged in a row which extend into said length of horizontal pipe;
a capped end of said length of horizontal pipe;
a first bent length of pipe having an interior in fluid and direct connection with said length of horizontal pipe;
a second bent length of pipe having an interior in fluid and direct connection with said first bent length of pipe; and
a vertical length of pipe in fluid and direct connection with said second bent length of pipe,
wherein said first bent length of pipe includes a first elbow portion, a second elbow portion, and a third elbow portion, each of said first, second, and third elbow portions each having a 90 degree bend, said first elbow portion extending from a non-capped end of said length of horizontal pipe, said second elbow portion being disposed between, and connected to, said first and third elbow portions,
wherein said second elbow portion and said third elbow portion are rotatable relative to each other about a horizontal rotation axis extending substantially in parallel to said length of horizontal pipe, wherein rotation of said second and third elbow portions relative to each other is adapted to transition said first bent length of pipe from a planar state in which said first, second, and third elbow portions are all in a single plane, to a non-planar state in which said first and second elbow portions are in one plane, and said third elbow portion is in another plane,
wherein said second bent length of pipe includes a vertically arranged linear portion, a fourth elbow portion, and a fifth elbow portion, said fourth and fifth elbow portions each having a 90 degree bend, said vertically arranged linear portion being connected to said third elbow portion of said first bent length of pipe and to said fourth elbow portion, said fourth elbow portion being connected to said fifth elbow portion, said fifth elbow portion being connected to said vertical length of pipe,
wherein said fourth elbow portion is rotatable relative to said vertically arranged linear portion about a vertical rotational axis,
wherein relative rotation of said second and third elbow portions relative to each other is adapted to cause said length of horizontal pipe to abut the side wall of the fish tank and a lower surface of the lip.

2. The fish tank spray device of claim 1, further comprising at least one ring having an opening extending therein, said at least one ring adapted to extend about said length of horizontal pipe and the lip to hold said length of horizontal pipe to the fish tank.

3. The fish tank spray device of claim 2, wherein said opening has an arc angle of less than 15 degrees when said ring is unencumbered.

4. The fish tank spray device of claim 3, wherein said at least one ring is adapted to abut the side wall of the fish tank on either side of said opening.

5. The fish tank spray device of claim 4, wherein an interior side of said ring circumferentially surrounds and contacts an exterior side of said length of horizontal pipe.

6. The fish tank spray device of claim 5, wherein said vertical length of pipe is adapted to be disposed exterior to the fish tank, and said second bent length of pipe is adapted to be disposed over the top of the side wall of the fish tank, from the exterior of the fish tank to an interior thereof.

7. The fish tank spray device of claim 1, wherein said fourth and fifth elbow portions are fixed relative to each other and wherein said first and second elbow portions are fixed relative to each other.

* * * * *